United States Patent [19]

Hahnkamm et al.

[11] 3,836,378

[45] Sept. 17, 1974

[54] PRODUCTION OF COMPOSITE PIGMENTS OF IRON OXIDE AND CARBON BLACK

[75] Inventors: Volker Hahnkamm; Jakob Rademachers; Hanno Henkel; Karl Brandle; Kurt Schafer, all of Krefeld, Germany

[73] Assignee: Bayer Aktiengesellschaft, Leverkusen, Germany

[22] Filed: May 1, 1973

[21] Appl. No.: 356,271

[30] Foreign Application Priority Data
May 12, 1972 Germany............................ 2223129

[52] U.S. Cl. .......... 106/288 R, 106/288 B, 106/307
[51] Int. Cl............................................. C08h 17/02
[58] Field of Search................ 106/288 B, 307, 304

[56] References Cited
UNITED STATES PATENTS

| | | | |
|---|---|---|---|
| 2,266,104 | 12/1941 | Vogel et al. | 106/307 |
| 2,564,700 | 8/1951 | Krejci | 423/209.4 |
| 3,186,928 | 6/1965 | Keaton et al. | 106/307 X |
| 3,318,720 | 5/1967 | Johnson et al. | 106/307 |

FOREIGN PATENTS OR APPLICATIONS

| | | | |
|---|---|---|---|
| 1,234,697 | 2/1967 | Germany | 106/307 |

*Primary Examiner*—Delbert E. Gantz
*Assistant Examiner*—Juanita M. Nelson
*Attorney, Agent, or Firm*—Burgess, Dinklage & Sprung

[57] ABSTRACT

A process for producing a composite pigment comprising iron oxide and carbon black, comprising introducing into a reaction zone at a temperature of about 450° to 850°C hot gas laden with carbon black, a suspension of iron oxide or hydroxide and a material which binds carbon to iron oxide under the conditions in the reactor. The iron oxide or hydroxide source is preferably a waste sludge and the binder is preferably an organic material such as molasses, tar pitch, sulfite waste liquor and fish glue or an inorganic material such as waterglass or $SiO_2$ hydrosol. An oxidizing after-treatment renders the pigment hydrophilic.

9 Claims, No Drawings

PRODUCTION OF COMPOSITE PIGMENTS OF IRON OXIDE AND CARBON BLACK

This invention relates to a continuous process for the production of composite pigments which contain predominantly iron oxide and carbon black by treating an iron-containing waste sludge with a hot gas which is laden with soot at elevated temperatures.

Various processes for producing iron oxide/carbon black pigments are already known. These processes are all based on the use of relatively expensive metal salts as starting materials which are either thermally decomposed in the presence of carbon black or which are put into the process in the form of alkaline solutions from which the iron oxide is precipitated, carbon black being then adsorbed on the surface of the precipitated iron oxide.

According to one process, carbon black is suspended in an aqueous salt solution, spray dried and then annealed under an inert gas (German Auslegeschrift No. 1,191,505). The disadvantage of this procedure is that it is a two stage process and the second stage must be carried out under inert conditions.

Products containing 10 to 50° of carbon black can be obtained by evaporating iron halides or dissolving other iron salts in hydrocarbons and injecting them into a carbon black reactor (US Pat. No. 3,094,428). Since the iron compounds are liable to be reduced at temperatures above 1,000°C, only expensive low molecular weight, unsaturated hydrocarbons may be used for producing the carbon black. Carbon black cannot be obtained by cracking higher hydrocarbons at such low temperatures.

A composite pigment may also be obtained by adsorbing carbon black on the surface of freshly precipitated $Fe_3O_4$ (Great Britain Pat. No. 1,178,050), but only up to 10° of carbon black can be bound by this method.

Magnetic black pigments can also be produced when hot gases laden with carbon black which are obtained from the production of carbon black are chilled to a temperature of about 820°C with an aqueous dispersion which contains a compound of one or more of the elements iron, cobalt and nickel (US Pat. No. 3,431,205).

The processes just described produce pigments for special purposes and this makes it necessary to use relatively pure and therefore expensive compounds as starting materials. In most cases, these processes also involve problems of corrosion since the thermal decomposition gives rise to substances, such as hydrogen halides, sulfur oxides, nitrogen oxides, etc., which form strongly acid solutions in the presence of water. The high expense of producing these pigments justifies their use as magnetic pigments or as pigments used for example, in printing inks.

It is accordingly an object of this invention to produce inexpensive black pigments which are particularly suitable for use in the building industry.

These and other objects and advantages are realized in accordance with the present invention pursuant to which there is produced an iron oxide-carbon black composite pigment by introducing into a reaction zone at a temperature of about 450° to 850°C hot gas laden with carbon black, a suspension of iron oxide or hydroxide and a material which binds carbon to iron oxide under the conditions in the reactor.

It has surprisingly been found that the use of inexpensive waste sludge containing iron instead of black pigment sludge based on $Fe_3O_4$ does not adversely affect the pigment properties of the resulting composite pigment. When using such waste sludges, the temperature in the reactor should be adjusted to within the range of about 450°C to 850°C, preferably about 600°C to 800°C. Substantial reduction of trivalent iron occurs at temperatures above 850°C. The waste sludges used may be iron-containing sludges of the kind obtained, e.g., from waste water or from the production of bauxite.

According to the invention, substances which promote bonding between oxide and carbon black are added to these sludges. These additives may be higher molecular weight organic substances which are easily thermally decomposed, e.g., molasses, tar pitch, sulfite waste liquor or fish glue, or inorganic substances such as waterglass or $SiO_2$ hydrosol. The organic substances not only act as bonding agents but are also capable of influencing the reduction of Fe (III) to Fe (II) to varying extents depending on the quantity in which they are used and the temperature. Reduction is promoted by elevated temperatures in the reactor. This reduction allows for the successful use even of those waste sludges which, as is frequently the case, have an Fe (II) : Fe (III) ratio of less than 1 : 2. The ratio of 1 : 2, which occurs in $Fe_3O_4$, is desirable owing to the greater intensity of color and purer color tone obtained in the composite pigment.

It has further surprisingly been found that the composite pigments according to the invention may be rendered hydrophilic by oxidation while leaving the Fe(II) : Fe (III) ratio practically unchanged; i.e., unwanted oxidation of divalent iron into the trivalent phase, which would lead to the formation of $Fe_2O_3$, does not take place. Many oxidizing agents are suitable for the oxidizing after-treatment of pure carbon blacks, e.g., chromates, persulfates, permanganates, oxygen, nitric acid, hydrogen peroxide (FR 1,164,786) or bleaching liquor (sodium hypochlorite solution, US Pat. No. 2,439,442). Bleaching liquor and $KMnO_4$ have been found to be particularly suitable oxidizing agents.

The advantage of the process according to the invention is that from inexpensive starting materials a simple process is used to produce black pigments containing any proportion of carbon black, preferably about 20 to 70° by weight and in particular about 25 to 45° by weight, which after suitable oxidative after-treatment are comparable to pure carbon blacks in their color intensity, e.g., for coloring building materials, but which preserve the high weathering resistance (preservation of the color tone) of the iron oxide pigments.

According to a preferred embodiment, the process may be carried out as follows: A hot gas laden with carbon black is produced by the furnace process described in US Pat. No. 2,564,700. A hot gas produced by burning petroleum hydrocarbons in air, is conveyed tangentially into a carbon black reactor into which a hydrocarbon (e.g., a medium fraction from the cracking of petroleum) suitable for producing carbon black is injected axially. Either all the oil may be cracked or only a part may be cracked and the remainder burnt. In the second case, the additional quantity of air required for combustion of the petroleum should be introduced into the hot gas conduit through a separate connection or the gas burner should be operated with an excess of air.

The hot gas laden with carbon black, which is formed in the carbon black reactor and which is at a temperature of about 1,100° to 1,400°C, preferably about 1,150° to 1,350°C, is introduced into the main reactor where formation of the composite pigment takes place. The hot gas must be used in such a quantity that the reaction temperature in the reactor is maintained within the range of about 450°C to 850°C, preferably about 600°C to 800°C. The sludge which contains mainly iron oxide should have a sufficiently low solids content to enable it to be pumped and sprayed in finely divided form through nozzles or spray discs, which is the case if the solids content is about 20 to 60°, preferably about 40 to 50°. A possible composition of this waste sludge is, for example, as follows: 72 to 75° $Fe_2O_3$, 13 to 16 percent FeO, about 3 percent $MnO_2$, about 2 percent $SiO_2$, 5 to 7 percent loss by annealing (based on dry substance in percent by weight). Other compositions are also possible without the advantageous properties of the resulting product being diminished.

The quantity of sludge and of carbon black are so adjusted to each other that the proportion of carbon black in the end product is about 20 to 70 percent by weight, preferably about 25 to 45 percent by weight. About 0.1 to 0.3 Kg of bonding agent per Kg of carbon black (in the end product) is added to the sludge and intimately mixed with it before the sludge is injected into the reactor.

The reactor may be in the form of a spray drier into which the waste sludge is injected axially from above and the hot gases which contain carbon black are introduced in the same direction. Alternatively, the reactor may be in the form of a cylindrical spray tower with the hot gases introduced at the bottom and directed upwardly and the sludge injected countercurrent thereto.

Recovery of the composite pigment from the hot waste gas is preferably carried out by wet deposition. According to a particularly preferred embodiment of the process of the invention, this is carried out as follows: After chilling to a temperature below 100°C combined with preliminary separation of solids, the remainder of the product is recovered from the waste gas by means of a Venturi scrubber. The scrubbing liquid used is a suspension which is formed during the course of the reaction and is recirculated. When it attains a solids content of about 6 to 10 percent, a portion is pumped off for recovery and make-up water is substituted.

The oxidative after-treatment is advantageously carried out by means of a prior addition of an oxidizing agent, for example bleaching liquor or $KMnO_4$ solution, to the circulating suspension. In this way, the desired end product is obtained in a single stage. Apart from being a single stage process, this method has the further advantage that wet deposition is improved because the composition pigment is rendered hydrophilic.

The bond between iron oxide and carbon black is tested by investigating the magnetic behavior of the iron oxide. The test was standardized to ensure comparable results and carried out as follows:
5 g of product which had not been after-treated were dispersed in 200 ml of water with the aid of an intensive stirrer (maximum idling speed of rotation 10,000 revs/min) operating for 5 minutes. The suspension was then introduced into a glass beaker having a diameter equal to the soft iron core of the electromagnet used.

Settling of the solid was prevented by stirring the suspension. After 1 minute, the stirrer was switched off and at the same time the electromagnet was switched on. The iron oxide with carbon black adhering to it was thereby drawn to the bottom of the beaker. The supernatant water and the carbon black contained in it were immediately sucked off. Since the presence of free particles of carbon black in the particles of iron oxide/carbon black which had been attracted magnetically could not be excluded, the process of stirring and suction using the electromagnet was repeated five times.

The results were determined by comparing the carbon black contents of the composite pigment before and after separation. The ratio of the carbon content after separation to that before is expressed as percent bonding.

To determine the color strength, a cement sludge to which 1% of the pigment had been added was sprayed on to a test sample of concrete.

After drying, the brightness reference value A (according to DIN 5033, Sheet 1, No. 12) was measured with IR filters in a remission photometer (Elrepho, Zeiss). The degree of blackness was obtained by subtracting the brightness reference value A from 100.

The degree of blackness of the following black pigments is determined for comparison with the composite pigments produced by the process according to the invention:

| Pigment | Degree of blackness |
|---|---|
| Iron oxide ($Fe_3O_4$) | 81.5 |
| Carbon Black (25 m²/g specific surface) | 91.7 |

The process according to the invention will be explained more fully with the aid of the following examples. The products obtained were after-treated by oxidation with bleaching liquor or $KMnO_4$ solution. The quantities necessary for the after-treatment depend on the surface area of the pigment which is to be after-treated. When bleaching liquor (concentration 200 – 250 g NaOCl/l) is used, 6 to 8 mg/m² pigment surface are used. When $KMnO_4$ solution (20 – 40 g $KMnO_4$/l) is used, the corresponding figures are 2 to 4 mg/m² pigment surface.

EXAMPLE 1

300 g of a sludge from waste water (50 percent by weight of solids comprising 75 percent $Fe_2O_3$ and 15 percent FeO) were intimately mixed with 64 g of carbon black (BET surface 30 m²/g) and 15 g of molasses by stirring and then filtered and dried in a drying cupboard at 120°C. Analysis showed a carbon content of 30 percent by weight. After carrying out the bonding test, the sample contained 8 percent of the carbon originally present (for properties of product see Table 1).

Example 2

A spray reactor operated in co-current manner, having an internal diameter of 1,800 mm and a height of about 5,000 mm, was heated to a temperature of 750°C by combustion of natural gas, the hot gas having first been conducted tangentially into a carbon black reactor and from there coaxially into the spray reactor through an annular gap. 50 Kg/h of medium fraction petroleum were injected into the carbon black reactor and completely cracked. At the same time, 173 kg/h of waste sludge as in Example 1 in which 6.0 kg of molasses were dissolved were injected axially into the spray reactor from above. About 98 percent of product separated from the waste gas. The remainder of the solids were separated from waste gas in an adjacent scrubbing tower. The experiment was stopped after 3 hours. The suspension was filtered on a filter press, washed and dried at 110°C (for properties of product see Table 1). The product contained 31.2percent of C. The test indicated 94percent bonding.

Example 3

The experimental conditions were the same as in Example 2 but no molasses were added to the iron oxide (see Table 1). To make up for this, the quantity of cracked oil was increased to 54 kg/h. Analysis of the carbon content indicated 30.8percent and bonding was 3percent.

Example 4

54 kg/h of medium cracking petroleum were cracked in the apparatus described in Example 2. 173 kg/h of waste sludge from the production of bauxite (35 percent solids by weight comprising 40 percent $Fe_2O_3$, 30 percent $Al_2O_3$, 15 percent $SiO_2$) in which 6.0 kg of molasses were dissolved were injected into the spray reactor (680°C). The experiment was continued for 3 hours. The carbon content was 53.2 percent (see Table 1).

Example 5

The experimental conditions were the same as in Example 2. Instead of waste sludge, a corresponding quantity of iron oxide/-black pigment sludge was injected ($Fe_3O_4$ pigment). The test showed 91percent bonding (see Table 1).

Example 6

The experimental conditions were the same as in Example 2 except that the inorganic bonding agent waterglass (525 g/l of sodium silicate) was added instead of molasses (see Table 1). Carbon analysis showed the presence of 29.8 percent. Bonding was 88 percent. The $Fe^{3+}/Fe^{2+}$ ratio established is the same as in Example 3.

Example 7

The bonding agent used in this example was sulfite waste liquor. The experiment was carried out with the apparatus described in Example 2. Again increased reduction of trivalent iron was recorded. The carbon content was 32.5percent and bonding was 91percent.

It will be appreciated that the instant specification and examples are set forth by way of illustration and not limitation, and that various modifications and changes may be made without departing from the spirit and scope of the present invention.

Table 1

| Example | | 1 | 2 | 3 | 4 | 5 | 6 | 7 |
|---|---|---|---|---|---|---|---|---|
| Temperature in the reactor | (°C) | | 750 | 750 | 680 | 700 | 760 | 750 |
| Throughput of sludge | (kg/h) | 0.300 | 173 | 180 | 173 | 180 | 180 | 180 |
| Sludge concentration | (%) | 50 | 50 | 50 | 35 | 50 | 50 | 50 |
| Oil | (kg/h) | — | 50.2 | 54 | 54 | 54 | 54 | 54 |
| Carbon black | (kg/h) | 0.064 | — | — | — | — | — | — |
| Additive (bonding agent) | (kg/h) | 0.015 | 6.0 | — | 6.0 | 8.0 | 10.0 | 6.0 |
| Additive/carbon black ratio | | 0.23 | 0.17 | — | 0.16 | 0.21 | 0.26 | 0.16 |
| C content | (%) | 30 | 31.2 | 30.8 | 52.3 | 32 | 29.8 | 32.3 |
| C yield (oil and natural gas) | (%) | — | 62 | 61.5 | 61.6 | 61.7 | 61.7 | 61.5 |
| $Fe^{3+}/Fe^{2+}$ ratio | | 4.4 | 2.0 | 2.9 | 1.6 | 1.9 | 2.8 | 1.8 |
| Bonding | (%) | 8 | 94 | 3 | 90 | 91 | 88 | 91 |
| Degree of blackness | | 87.9 | 88.1 | 88.0 | 90.5 | 88.1 | 87.7 | 88.5 |
| Specific surface according to BET | (m²/g) | 23 | 16 | 16 | 21 | 18 | 16 | 17 |

What is claimed is:

1. A process for producing a composite pigment comprising iron oxide and carbon black, comprising introducing into a reaction zone at a temperature of about 450° to 850°C hot gas laden with carbon black, a suspension of iron oxide or hydroxide and a material that comprises at least one material selected from the group consisting of molasses, tar pitch, sulfite waste liquor, fish glue, waterglass and $SiO_2$ hydrosol which binds carbon to iron oxide under the conditions in the reactor.

2. The process of claim 1 wherein said binder material is a high molecular weight organic material which decomposes at the temperature in the reaction zone.

3. The process of claim 1 wherein the binder material is introduced in such amount that the ratio of Fe(II) to Fe(III) in the composite pigment is about 1:2.

4. The process of claim 1 wherein the binder material is employed in about 0.1 to 0.3 part per part by weight of carbon in the resulting composite pigment.

5. The process of claim 1 wherein the suspension of iron oxide or hydroxide is a waste sludge.

6. The process of claim 1 wherein the carbon black is present in said hot gas in amount sufficient to produce a composite pigment comprising about 20 to 70percent by weight of carbon.

7. The process of claim 1 including the additional step of oxidizing the composite pigment.

8. The process of claim 7 wherein oxidation is effected with bleaching liquor or a solution of $KMnO_4$, the pigment thereby being rendered hydrophilic.

9. The process of claim 1 wherein the reaction is effected continuously, the carbon black is present in said hot gas in amount sufficient to produce a composite pigment comprising about 25 to 45percent by weight of carbon, the binder material is employed in about 0.1 to 0.3 part per part by weight of carbon in the resulting composite pigment and comprises at least one material selected from the group consisting of molasses, tar pitch, sulfite waste liquor and fish glue, and the suspension of iron oxide or hydroxide is a waste sludge, the reaction zone being maintained at a temperature of about 600° to 800°C.

* * * * *